(12) United States Patent
Sakurai et al.

(10) Patent No.: US 11,041,938 B2
(45) Date of Patent: Jun. 22, 2021

(54) RADAR APPARATUS

(71) Applicant: DENSO CORPORATION, Kariya (JP)

(72) Inventors: Kazumasa Sakurai, Nisshin (JP);
Toshiya Sakai, Nisshin (JP); Kazushi Kawaguchi, Nisshin (JP); Asahi Kondo, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/796,045

(22) Filed: Feb. 20, 2020

(65) Prior Publication Data

US 2020/0191904 A1 Jun. 18, 2020

Related U.S. Application Data

(63) Continuation of application No. PCT/JP2018/031026, filed on Aug. 22, 2018.

(30) Foreign Application Priority Data

Aug. 24, 2017 (JP) .............................. JP2017-161266

(51) Int. Cl.
*G01S 7/282* (2006.01)
*G01S 13/12* (2006.01)
(Continued)

(52) U.S. Cl.
CPC .............. *G01S 7/282* (2013.01); *G01S 13/12* (2013.01); *G01S 13/426* (2013.01); *G01S 13/931* (2013.01); *G01S 2013/93275* (2020.01)

(58) Field of Classification Search
CPC ...... G01S 13/12; G01S 13/426; G01S 13/931; G01S 2013/93275; G01S 7/282;
(Continued)

(56) References Cited

U.S. PATENT DOCUMENTS

2006/0261968 A1   11/2006   Shirakawa
2007/0229357 A1*  10/2007   Zhang ...................... H01Q 3/44
                                                343/700 MS
(Continued)

FOREIGN PATENT DOCUMENTS

JP            2006-329658 A        12/2006

*Primary Examiner* — Timothy X Pham
(74) *Attorney, Agent, or Firm* — Maschoff Brennan

(57) ABSTRACT

A radar apparatus is provided which includes an antenna section that is configured to radiate radio waves based on fed electrical power, a plate dielectric member that is provided so as to transmit the radio waves radiated from the antenna section, a filter portion that is provided to the dielectric member and includes a plurality of band transmission portions arranged along a scanning direction, the plurality of band transmission portions being configured to respectively transmit radio waves within different specific transmission frequency bands, and a power feeding section that is configured to feed the electrical power to the antenna section and is configured to set specific frequency bands included in the respective specific transmission frequency bands to set radiation bands and sequentially change a frequency of the radio waves radiated from the antenna section to frequencies within the respective set radiation bands.

6 Claims, 14 Drawing Sheets

(51) Int. Cl.
*G01S 13/42* (2006.01)
*G01S 13/931* (2020.01)

(58) Field of Classification Search
CPC .. G01S 13/93; G01S 7/03; H01Q 3/22; H01Q 15/0013; H01Q 15/14; H01Q 1/22; H01Q 1/3233; H01Q 1/42; H01Q 1/422; H01Q 1/425
See application file for complete search history.

(56) References Cited

U.S. PATENT DOCUMENTS

| | | | |
|---|---|---|---|
| 2008/0284651 A1* | 11/2008 | Pearson | H01Q 3/22 342/372 |
| 2012/0019408 A1* | 1/2012 | Lee | G01S 13/426 342/83 |
| 2015/0311589 A1* | 10/2015 | Yokoyama | H01Q 1/38 343/722 |

* cited by examiner

RADAR APPARATUS

CROSS-REFERENCE TO RELATED APPLICATION

The present application is based on and claims the benefit of priority from Japanese Patent Application No. 2017-161266 filed on Aug. 24, 2017, the description of which is incorporated herein by reference.

BACKGROUND

Technical Field

The present disclosure relates to a radar apparatus.

Related Art

Various techniques for a radar apparatus using a beam for electronic scanning have been proposed. JP-A-2006-329658 discloses a technique for enabling high-speed beam scanning by using a variable impedance adjustment means to control electrical power fed to a plurality of antennas.

As a result of a detailed study by the inventors, the following problem was found. That is, to perform electronic scanning with a beam by using the technique disclosed in JP-A-2006-329658, a plurality of antennas are needed, which increases the radar apparatus in size.

SUMMARY

As an aspect of the present disclosure, a radar apparatus is provided which includes: an antenna section that is configured to radiate radio waves based on fed electrical power; a plate dielectric member that is provided so as to transmit the radio waves radiated from the antenna section; a filter portion that is provided to the dielectric member and includes a plurality of band transmission portions arranged along a scanning direction, the plurality of band transmission portions being configured to respectively transmit radio waves within different specific transmission frequency bands; and a power feeding section that is configured to feed the electrical power to the antenna section and is configured to set specific frequency bands included in the respective specific transmission frequency bands to set radiation bands and sequentially change a frequency of the radio waves radiated from the antenna section to frequencies within the respective set radiation bands.

DETAILED DESCRIPTION OF THE PREFERRED EMBODIMENTS

Various techniques for a radar apparatus using a beam for electronic scanning are proposed. JP-A-2006-329658 discloses a technique for enabling high-speed beam scanning by using a variable impedance adjustment means to control electrical power fed to a plurality of antennas.

As a result of a detailed study by the inventors, the following problem was found. That is, to perform electronic scanning with a beam by using the technique disclosed in JP-A-2006-329658, the plurality of antennas are needed, which increases the radar apparatus in size.

An aspect of the present disclosure provides a technique capable of performing scanning with sent radio waves while reducing the number of antennas to be used.

Hereinafter, exemplary examples of the present disclosure will be described with reference to the drawings.

1. First Embodiment (1-1) Overall Configuration of Radar Apparatus

Figure 1:
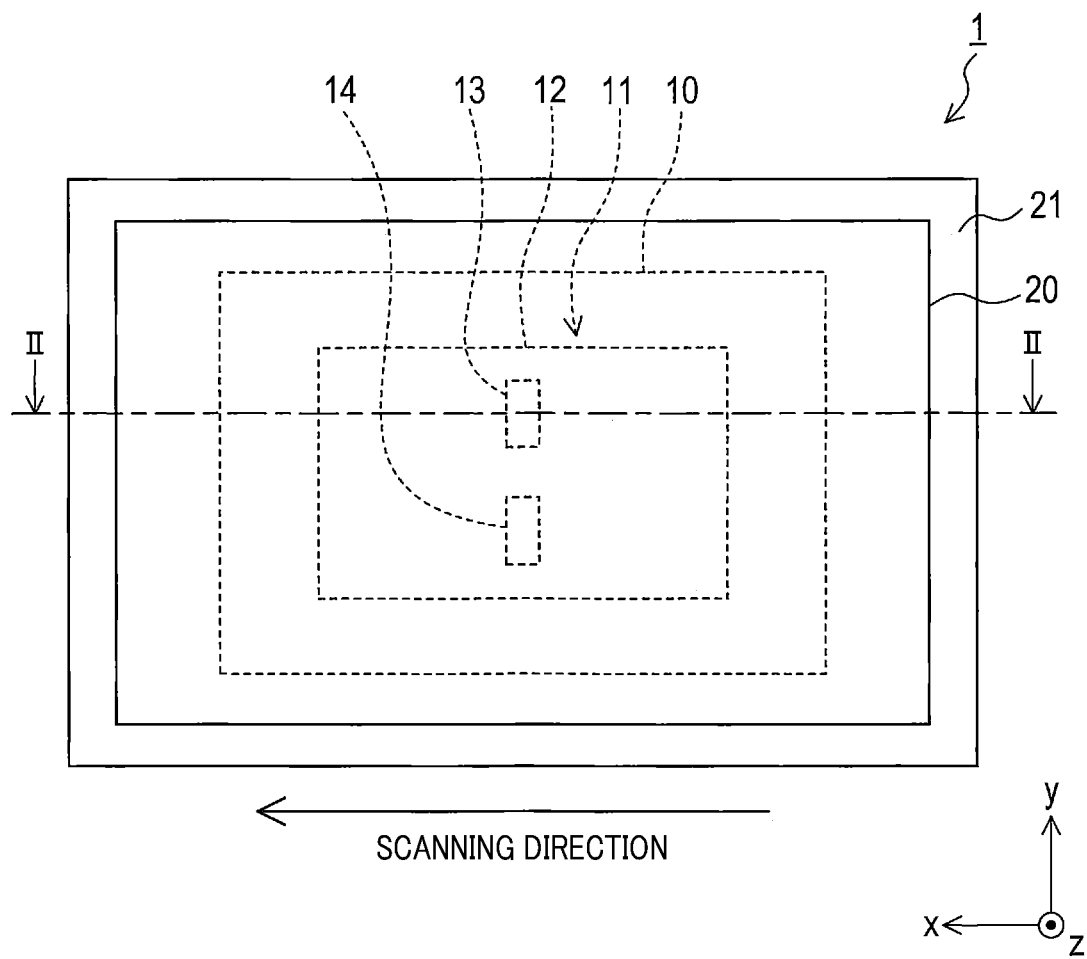
FIG. 1 is a front view of a radar apparatus according to a first embodiment.
Figure 2:
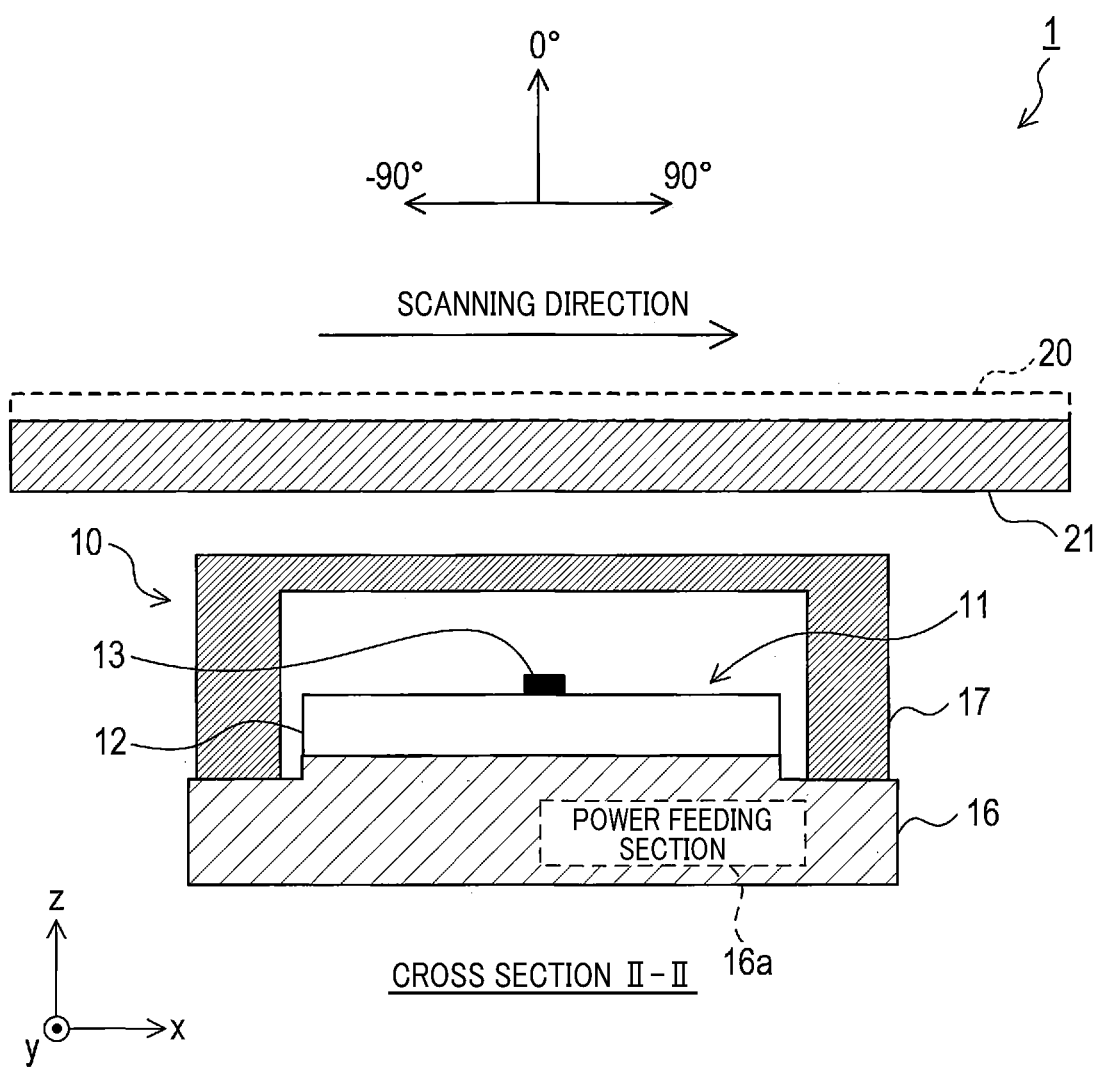
FIG. 2 is a cross-sectional view taken across a line II-II in the radar apparatus in FIG. 1.

As shown in FIG. 1 and FIG. 2, a radar apparatus 1 of the first embodiment includes a radar body 10, a dielectric plate 21, and a filter portion 20. The radar apparatus 1 is installed, for example, in a vehicle, not shown, so as to be able to radiate radio waves forward from the vehicle. The radar apparatus 1 is, for example, a so-called millimeter-wave radar configured to transmit and receive radio waves in a millimeter-wave band to detect targets present around the vehicle.

In FIG. 1, z is a direction that is parallel to a road surface, on which the vehicle runs. In the z direction, the vehicle runs forward and straight. In FIG. 1, y is a direction that is perpendicular to the road surface, on which the vehicle runs, and is upward from the vehicle. In FIG. 1, x is a direction that is parallel to the road surface, on which the vehicle runs, and is rightward with respect to the forward and straight direction. FIG. 1 shows the radar apparatus 1, which is installed in the vehicle, viewed from the front of the vehicle.

When the radar apparatus 1 is viewed from the front of the vehicle, as shown in FIG. 1 and FIG. 2, the radar body 10 is located behind the dielectric plate 21 and the filter portion 20. As described later, radio waves are radiated from the radar body 10. The radio waves radiated from the radar body pass through the dielectric plate 21 and the filter portion 20 and are radiated forward from the vehicle.

It is noted that the radio waves radiated from the radar body 10 do not uniformly pass through the whole dielectric plate 21. The area of the filter portion 20 through which radio waves pass changes depending on the frequency of the radio waves. The change of the frequency of the radio waves achieves scanning with the radio waves radiated forward from the vehicle through the filter portion 20. The scanning direction of the sent radio waves from the radar apparatus 1 of the present embodiment is, for example, the x direction.

The radar body 10 includes an antenna section 11, a transmitting and receiving processing section 16, and a cover member 17.

The antenna section 11 includes an antenna substrate 12, a transmitting antenna 13, and a receiving antenna 14. The antenna substrate 12 is formed of a dielectric such as resin. The transmitting antenna 13 and the receiving antenna 14 are provided on the antenna substrate 12. The transmitting antenna 13 and the receiving antenna 14 are, for example, microstrip array antennas.

Figure 6:
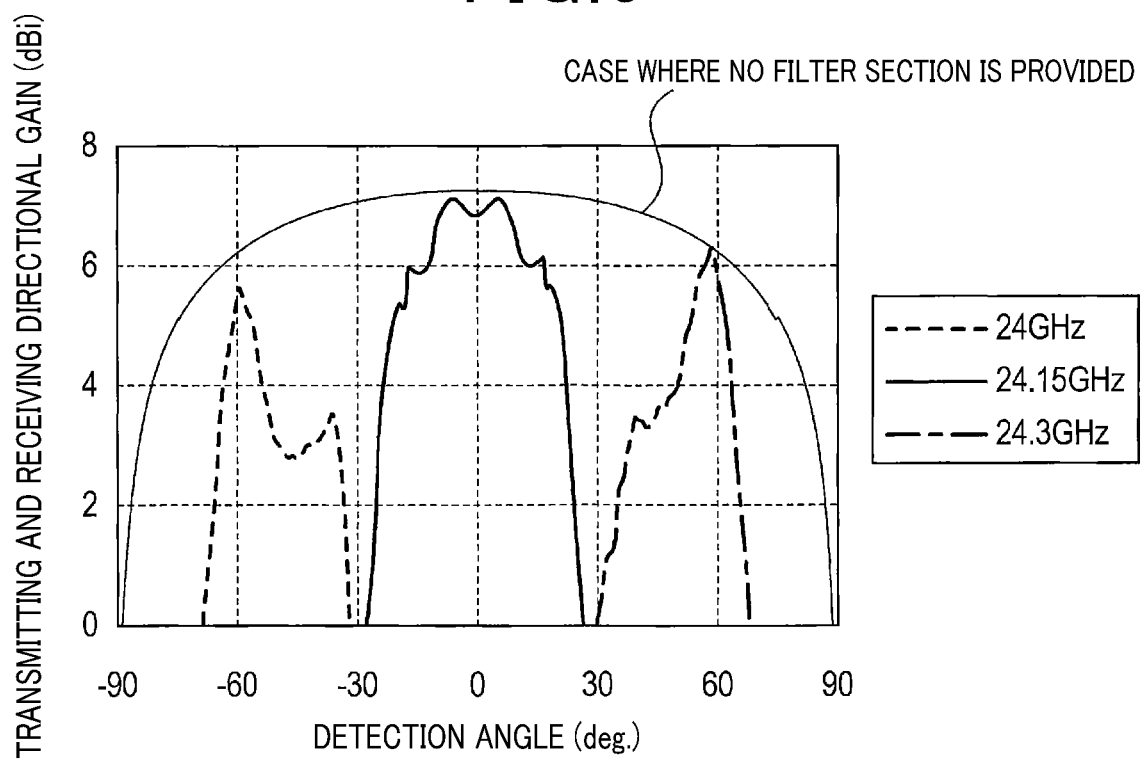
FIG. 6 is an explanatory drawing illustrating directional gains at respective frequencies in the filter portion according to the first embodiment.

The transmitting antenna 13 is configured to radiate radio waves based on electrical power for transmission fed from a power feeding section 16a described later. The receiving antenna 14 is configured to receive externally incoming radio waves. Transmission directional characteristics of a single transmitting antenna 13 and transmission directional characteristics of a single receiving antenna 14 are shown in FIG. 6 by a fine solid line as a case where no filter section is provided.

The positions where the transmitting antenna 13 and the receiving antenna 14 are provided are not limited. The relative positional relationship between the transmitting antenna 13 and the receiving antenna 14 are not limited. A microstrip array antennas is an example of each of the antennas 13 and 14. Any type of antenna can be used for each of the antennas 13 and 14.

The cover member 17 is a bottomed cylindrical member for covering the antenna section 11. The antenna section 11 is covered with the cover member 17, so that the antenna section 11 cannot be seen from the outside of the radar body 10.

The cover member 17 is formed of a dielectric such as resin. Hence, radio waves radiated from the antenna section 11 pass through the cover member 17 and are radiated forward. Radio waves incoming from the outside of the radar body 10 to the radar body 10 pass through the cover member 17 and reach the antenna section 11.

The dielectric plate 21 is a plate dielectric member. The dielectric plate 21 is provided in front of the radar body 10 so that radio waves radiated from the antenna section 11 pass through the dielectric plate 21 and are radiated forward from the vehicle. The dielectric plate 21 is disposed in the vehicle so that, for example, the plate surface thereof is parallel to the xy surface, that is, perpendicular to the z direction. The plate surface of the dielectric plate 21 is substantially parallel to the plate surface of the antenna substrate 12 to which the antennas 13 and 14 are provided.

The filter portion 20 is provided to one of two surfaces of the dielectric plate 21, said one of two surfaces being opposite to the other of two surfaces facing the radar body 10. That is, the filter portion 20 is provided to the surface facing to the front of the vehicle. The filter portion 20 may be provide to the other of the two surfaces facing the radar body 10. The filter portion 20 may be, for example, buried in the dielectric plate 21.

(1-2) Configuration of Filter Portion 20

Figure 3:
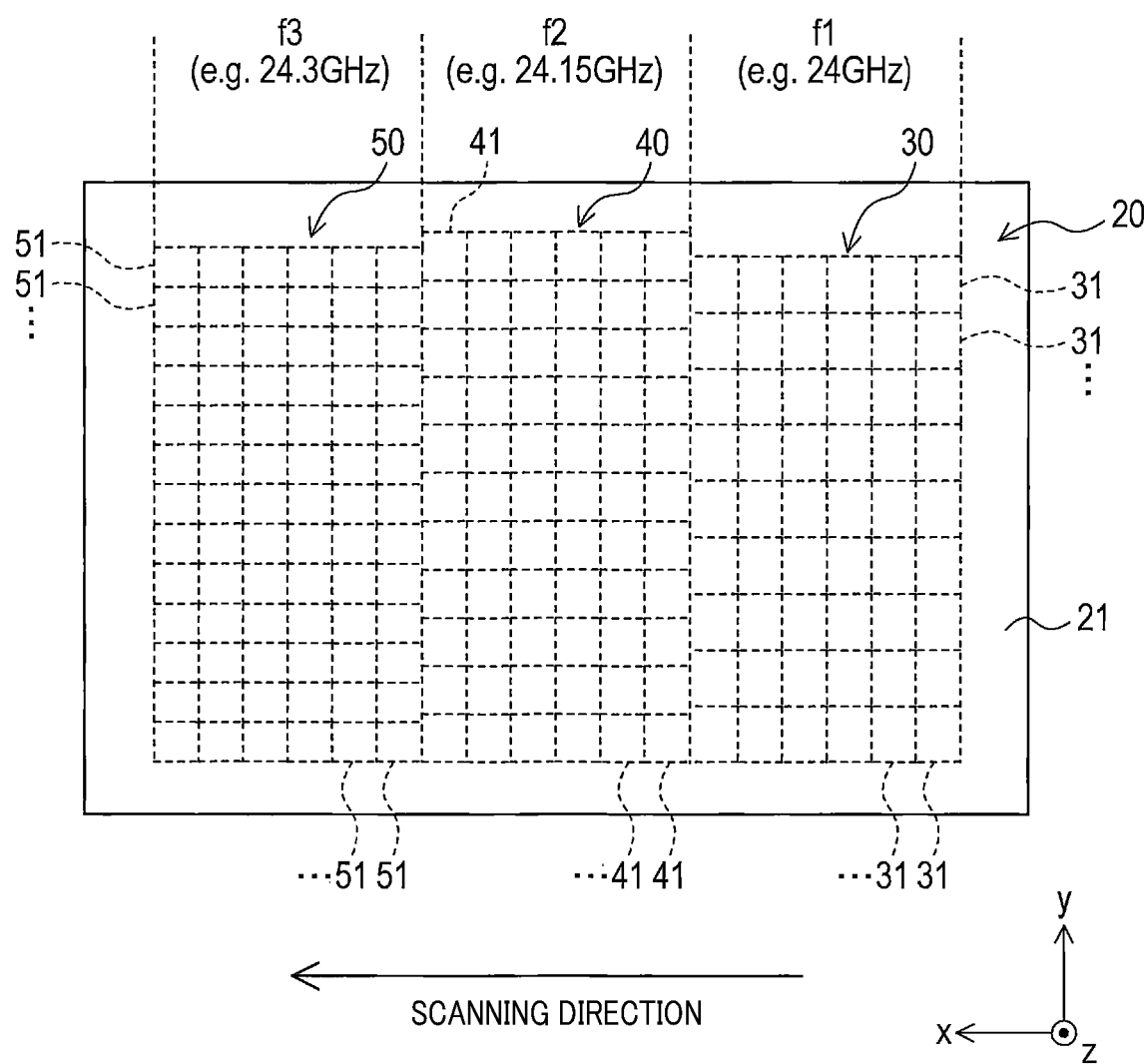
FIG. 3 is an explanatory drawing illustrating the configuration of a filter portion according to the first embodiment.

More specifically, as shown in FIG. 3, the filter portion 20 includes a first band transmission portion 30, a second band transmission portion 40, and a third band transmission portion 50. The first band transmission portion 30, the second band transmission portion 40, and the third band transmission portion 50 are adjacently arranged in this order along the scanning direction. In the following description, the direction that is one of the directions parallel to the plate surface of the dielectric plate 21 and is orthogonal to the scanning direction, that is, the y direction, is also referred to as a perpendicular direction.

The first band transmission portion 30 appropriately transmits radio waves having a frequency within a first transmission frequency band centering on a predetermined first transmission center frequency f1, and suppresses the amount of transmission of radio waves having a frequency outside the first transmission frequency band and inhibits the radio waves from being transmitted.

It is noted that the appropriate transmission herein means transmission of electrical power that can satisfy specifications required for the radar apparatus 1. For example, when transmission of electrical power equal to or more than P [dB] is required according to the specifications, the appropriate transmission means transmission of electrical power equal to or more than P [dB].

The second band transmission portion 40 appropriately transmits radio waves having a frequency within a second transmission frequency band centering on a predetermined second transmission center frequency f2, and suppresses the amount of transmission of radio waves having a frequency outside the second transmission frequency band and inhibits the radio waves from being transmitted. The second transmission center frequency f2 differs from the first transmission center frequency f1 and is higher than the first transmission center frequency f1.

The third band transmission portion 50 appropriately transmits radio waves having a frequency within a third transmission frequency band centering on a predetermined third transmission center frequency f3, and suppresses the amount of transmission of radio waves having a frequency outside the third transmission frequency band and inhibits the radio waves from being transmitted. The third transmission center frequency f3 differs from the second transmission center frequency f2 and is higher than the second transmission center frequency f2.

The first transmission center frequency f1 may be, for example, 24 GHz, in the present embodiment. The first transmission frequency band may be, for example, the first transmission center frequency f1±0.05 GHz.

The second transmission center frequency f2 may be, for example, 24.15 GHz, in the present embodiment. The second transmission frequency band may be, for example, the second transmission center frequency f2±0.05 GHz.

The third transmission center frequency f3 may be, for example, 24.3 GHz, in the present embodiment. The third transmission frequency band may be, for example, the third transmission center frequency f3±0.05 GHz.

Figure 5:
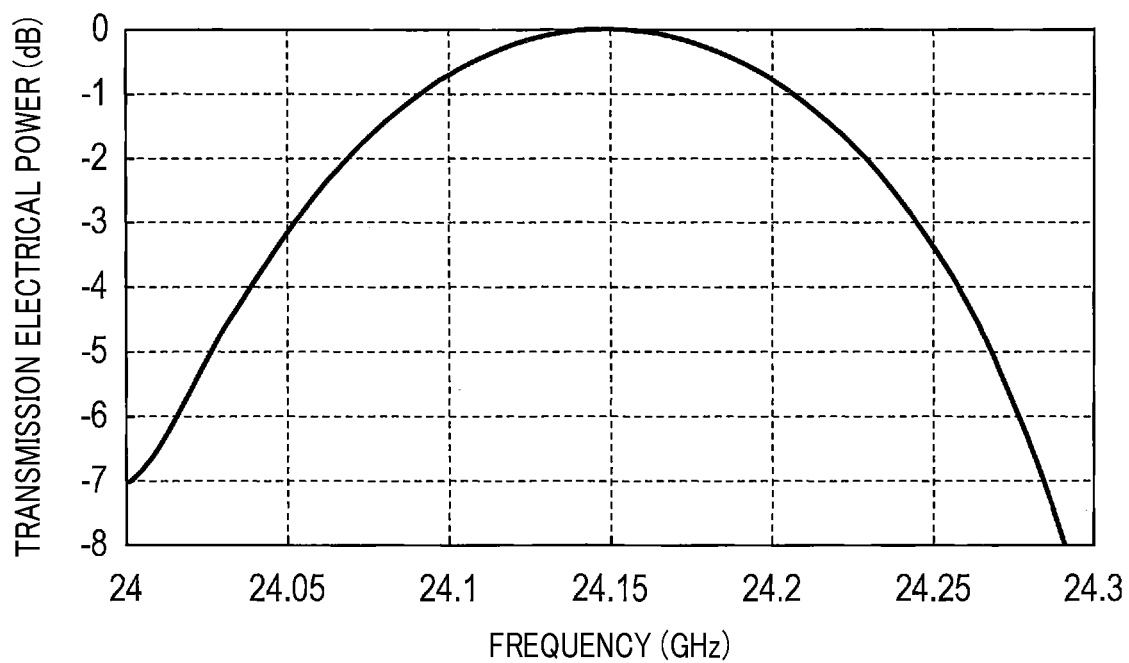
FIG. 5 is an explanatory drawing illustrating transmission characteristics of a band transmission portion according to the first embodiment.

FIG. 5 illustrates an example of frequency characteristics of transmission electrical power of the second band transmission portion 40. As shown in FIG. 5, the second band transmission portion 40 appropriately transmits radio waves within the second transmission frequency band having the second transmission center frequency f2±0.05 GHz of 24.15 GHz, and relatively suppresses the amount of transmission of radio waves outside the second transmission frequency band. The first band transmission portion 30 and the third band transmission portion 50 have frequency characteristics similar to frequency characteristics of the second band transmission portion 40 shown in FIG. 5. The frequency characteristics of the band transmission portions 30, 40, and 50 shown in FIG. 5 are one example. The frequency characteristics of the band transmission portions 30, 40, and 50 are not limited. For example. the frequency characteristics of the band transmission portions 30, 40, and 50 may satisfy specifications required for the band transmission portions 30, 40, and 50.

As shown in FIG. 3, the first band transmission portion 30 includes a plurality of filter cells 31. Specifically, the plurality of filter cells 31 are regularly arranged at regular intervals in the perpendicular direction. The plurality of filter cells 31 are regularly arranged at regular intervals in the scanning direction. In the first band transmission portion 30 illustrated in FIG. 3, six columns of filter cell groups each including nine filter cells 31 regularly arranged in the perpendicular direction are arrange in the scanning direction.

The number of the filter cells 31 shown in FIG. 3 is one example. The numbers of the filter cells 31 arranged in the perpendicular direction and scanning direction are not limited. The relative positional relationship in the perpendicular direction between two filter cell groups adjacent to each other in the scanning direction is not limited. FIG. 3 illustrates an example in which the relationships in the perpendicular direction between two filter cell groups adjacent to each other in the scanning direction are perfectly uniform. In contrast, for example, positions of two filter cell groups adjacent to each other in the scanning direction may be displaced from each other in the perpendicular direction.

Figure 4:
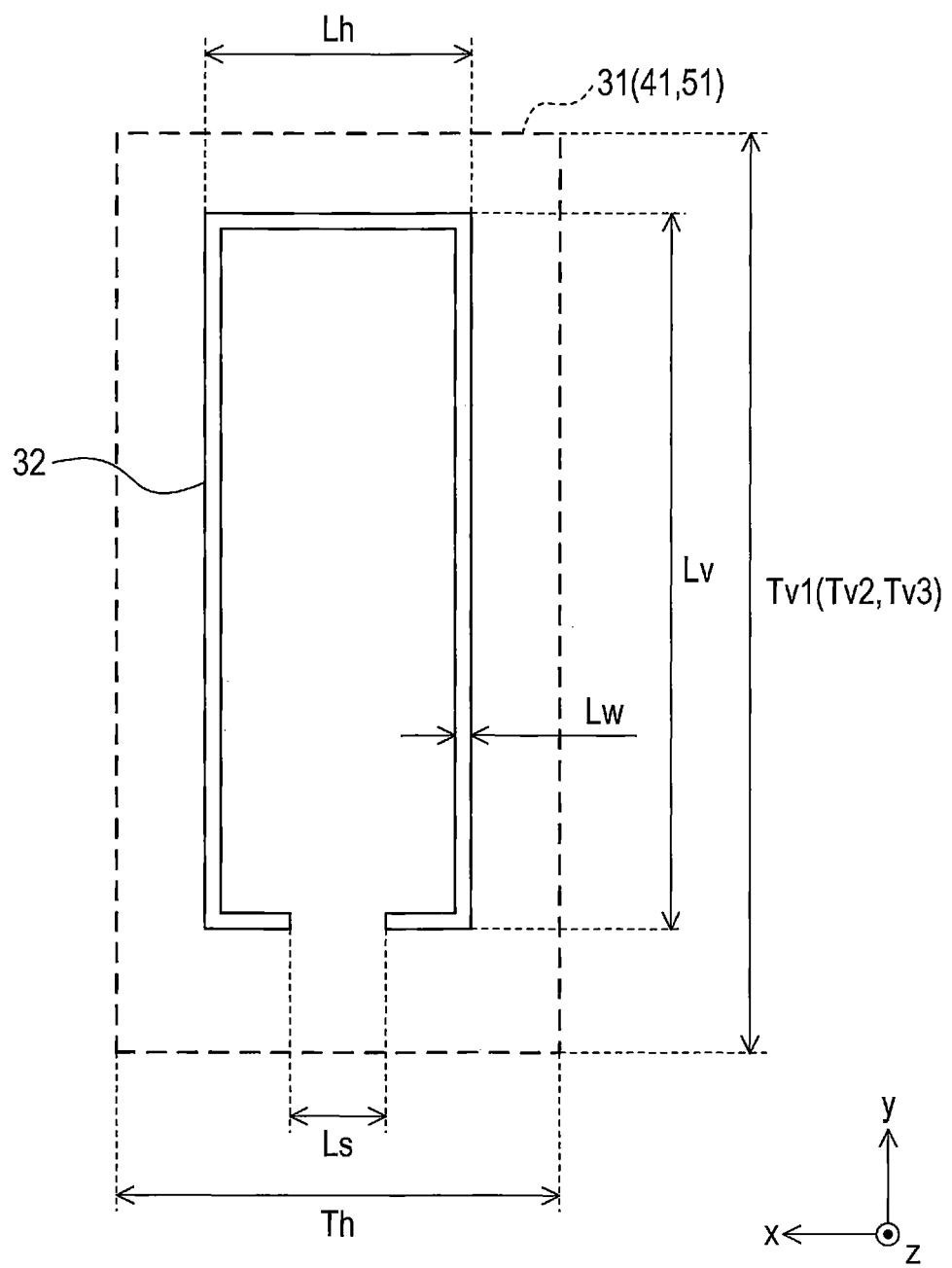
FIG. 4 is an explanatory drawing illustrating the configuration of a conductor pattern according to the first embodiment.

Specifically, as shown in FIG. 4, the filter cell 31 includes a conductor pattern 32. The conductor pattern 32 is a ring-shaped (specifically, rectangular ring-shaped) microstripline provided on the dielectric plate 21. The principal component of the conductor pattern 32 is copper.

The length of the conductor pattern 32 in the perpendicular direction is a predetermined pattern length Lv shorter than an arrangement interval Tv1 in the perpendicular direction. The length of the conductor pattern 32 in the scanning direction is a predetermined pattern width Lh shorter than an arrangement interval Th in the scanning direction. The conductor pattern 32 has a predetermined line width Lw.

The ring shape of conductor pattern 32 is not completely closed, and a partial section of the entire circumference of the ring shape is opened. The length of the opened section is a predetermined slit length Ls.

In the first band transmission portion 30, the conductor patterns 32 are regularly arranged at arrangement intervals Tv1 in the perpendicular direction, and are regularly arranged at arrangement intervals Th in the scanning direction.

Transmission characteristics of the first band transmission portion 30, that is, electrical characteristics including the first transmission center frequency f1 and the first transmission frequency band depend on various parameters such as the arrangement interval Tv1 in the perpendicular direction, sizes and shapes of parts of the conductor pattern 32, and a relative permittivity of the dielectric plate 21. One of the parameters significantly influencing the transmission characteristics of the first band transmission portion 30 is the arrangement interval Tv1 in the perpendicular direction.

As the arrangement interval Tv1 in the perpendicular direction is longer, the first transmission center frequency f1 is lower. As the arrangement interval Tv1 in the perpendicular direction is shorter, the first transmission center frequency f1 is higher.

The specific size of each of the filter cells 31 of the first band transmission portion 30 of the present embodiment may be, for example, as below. That is, the pattern length Lv of the conductor pattern 32 may be 11.71 mm, the pattern width Lh of the conductor pattern 32 may be 2.5 mm, the line width Lw of the conductor pattern 32 may be 0.5 mm, the slit length Ls of the conductor pattern 32 may be 0.5 mm, the arrangement interval Tv1 in the perpendicular direction may be 12.8 mm, and the arrangement interval Th in the scanning direction may be 3 mm. As a matter of course, these sizes are one example. According to the above dimensional structure, the first transmission center frequency f1 of the first band transmission portion 30 is set to, for example, 24 GHz.

Also in the second band transmission portion 40, as in the first band transmission portion 30, a plurality of filter cells 41 are regularly arranged in the perpendicular direction and the scanning direction. Also in the third band transmission portion 50, as in the first band transmission portion 30, a plurality of filter cells 51 are regularly arranged in the perpendicular direction and the scanning direction.

The second band transmission portion 40 and the third band transmission portion 50 differ from the first band transmission portion 30 mainly in the arrangement interval in the perpendicular direction.

All of the filter cells 41 of the second band transmission portion 40 and the filter cells 51 of the third band transmission portion 50 are configured similarly to those of the first band transmission portion 30, except for the arrangement interval in the perpendicular direction. That is, each of the filter cells 41 of the second band transmission portion 40 and the filter cells 51 of the third band transmission portion 50 includes the conductor pattern 32 shown in FIG. 4.

That is, in each of the band transmission portions 30, 40, and 50, each of the filter cells 31, 41, and 51 includes the same conductor pattern 32. In addition, the arrangement intervals Th of the conductor patterns 32 in the scanning direction in the band transmission portions 30, 40, and 50 are the same.

In the second band transmission portion 40, the arrangement intervals Tv2 of the filter cells 41 in the perpendicular direction (that is, the arrangement intervals of the conductor patterns 32 in the perpendicular direction) are shorter than the arrangement intervals Tv1 of the first band transmission portion 30 in the perpendicular direction. Specifically, in the present embodiment, the arrangement intervals Tv2 of the conductor patterns 32 of the second band transmission portion 40 in the perpendicular direction may be, for example, 12.71 mm. According to the above dimensional structure, the second transmission center frequency f2 of the second band transmission portion 40 is set to, for example, 24.15 GHz.

In the third band transmission portion 50, the arrangement intervals Tv3 of the conductor patterns 32 in the perpendicular direction are shorter than the arrangement intervals Tv2 of the second band transmission portion 30 in the perpendicular direction. Specifically, in the present embodiment, the arrangement intervals Tv3 of the conductor patterns 32 of the third band transmission portion 50 in the perpendicular direction may be, for example, 12.63 mm. According to the above dimensional structure, the third transmission center frequency f3 of the third band transmission portion 50 is set to, for example, 24.3 GHz.

The pattern length Lv of the conductor pattern 32 may be equivalent to a wavelength corresponding to the transmission center frequency. More specifically, in the present embodiment, the pattern length Lv of the conductor pattern 32 may be set to a length slightly shorter than the wavelength corresponding to the transmission center frequency.

The arrangement intervals Tv1, Tv2, and Tv3 in the perpendicular direction may also be equivalent to a wavelength corresponding to the transmission center frequency. More specifically, in the present embodiment, the arrangement intervals Tv1, Tv2, and Tv3 in the perpendicular direction may also be set to lengths slightly longer than the wavelength corresponding to the transmission center frequency.

(1-3) Configuration of Transmitting and Receiving Processing Section 16

Returning to FIG. 2, the configuration of the transmitting and receiving processing section 16 will be described in detail.

The transmitting and receiving processing section 16 includes the power feeding section 16a. The power feeding section 16a is configured to feed electrical power for transmission to the transmitting antenna 13 to cause the transmitting antenna 13 to radiate radio waves. In the present embodiment, the power feeding section 16a feeds transmission electrical power, which is for detecting targets around the vehicle, to the transmitting antenna 13. Upon the feed of the transmission electrical power to the transmitting antenna 13, radio waves for detecting targets (hereinafter, also referred to as probe waves) are radiated from the transmitting antenna 13.

The transmitting and receiving processing section 16 further includes a signal processing circuit. The signal processing circuit processes signals received by the receiving antenna 14 to obtain information regarding targets having reflected the probe waves.

That is, the transmitting and receiving processing section 16 causes the power feeding section 16a to feed transmission electrical power for detection to the transmitting antenna 13, so that the transmitting antenna 13 radiates the probe waves. When reflected waves of the probe waves are received by the receiving antenna 14, the transmitting and receiving processing section 16 obtains information regarding the targets having reflected the probe waves. The information regarding the targets may be, for example, the distances from a predetermined reference position in the vehicle to the targets, the directions from the reference position to the targets, or the like.

For example, the transmitting and receiving processing section 16 of the present embodiment transmits and receives probe waves by the frequency modulated continuous wave (FMCW) method to detect targets.

The power feeding section 16a does not transmit probe waves having a constant frequency only and probe waves having frequencies increasing and decreasing centering on a constant frequency. The power feeding section 16a sequentially transmits probe waves within a plurality of differently set radiation bands.

The plurality of set radiation bands are respectively included in the transmission frequency bands of the filter portion 20. That is, in the present embodiment, the plurality of set radiation bands include a first set radiation band, a second set radiation band, and a third set radiation band. The power feeding section 16a of the present embodiment sequentially changes the frequency of the electrical power fed to the transmitting antenna 13 to, for example, three types of frequencies including a frequency within the first set radiation band (e.g. a first set frequency Fs1), a frequency within the second set radiation band (e.g. a second set frequency Fs2), and a frequency within the third set radiation band (e.g. a third set frequency Fs3).

The first set radiation band is included in the first transmission frequency band of the first band transmission portion 30 of the filter portion 20. The second set radiation band is included in the second transmission frequency band of the second band transmission portion 40 of the filter portion 20. The third set radiation band is included in the third transmission frequency band of the third band transmission portion 50 of the filter portion 20.

When transmission electrical power of the first set frequency Fs1 (e.g. 24 GHz) is fed from a feeding section 13a, and radio waves of the first set frequency Fs1 are radiated from the transmitting antenna 13, the radio waves are appropriately transmitted through the first band transmission portion 30 in the filter portion 20. However, the second band transmission portion 40 and the third band transmission portion 50 relatively suppress the amount of transmission of the radio waves or inhibit the radio waves from being transmitted.

Hence, in this case, as illustrated by broken lines in FIG. 6, the gain of directivity of radio waves from the radar apparatus 1 becomes large in a direction in which the first band transmission portion 30 is present when viewing from the transmitting antenna 13, and becomes small in other directions.

When the frequency of the fed electrical power from the feeding section 13a is changed to the second set frequency Fs2 (e.g. 24.15 GHz), and radio waves of the second set frequency Fs2 are radiated from the transmitting antenna 13, the radio waves are appropriately transmitted through the second band transmission portion 40 in the filter portion 20. However, the first band transmission portion 30 and the third band transmission portion 50 relatively suppress the amount of transmission of the radio waves or inhibit the radio waves from being transmitted.

Hence, in this case, as illustrated by a thick solid line in FIG. 6, the gain of directivity of radio waves from the radar apparatus 1 becomes large in a direction in which the second band transmission portion 40 is present when viewing from the transmitting antenna 13, and becomes small in other directions.

When the frequency of the fed electrical power from the feeding section 13a is changed to the third set frequency Fs3 (e.g. 24.3 GHz), and radio waves of the third set frequency Fs3 are radiated from the transmitting antenna 13, the radio waves are appropriately transmitted through the third band transmission portion 50 in the filter portion 20. However, the first band transmission portion 30 and the second band transmission portion 40 relatively suppress the amount of transmission of the radio waves or inhibit the radio waves from being transmitted.

Hence, in this case, as illustrated by alternate long and short dash lines in FIG. 6, the gain of directivity of radio waves from the radar apparatus 1 becomes large in a direction in which the third band transmission portion 50 is present when viewing from the transmitting antenna 13, and becomes small in other directions.

Figure 7:
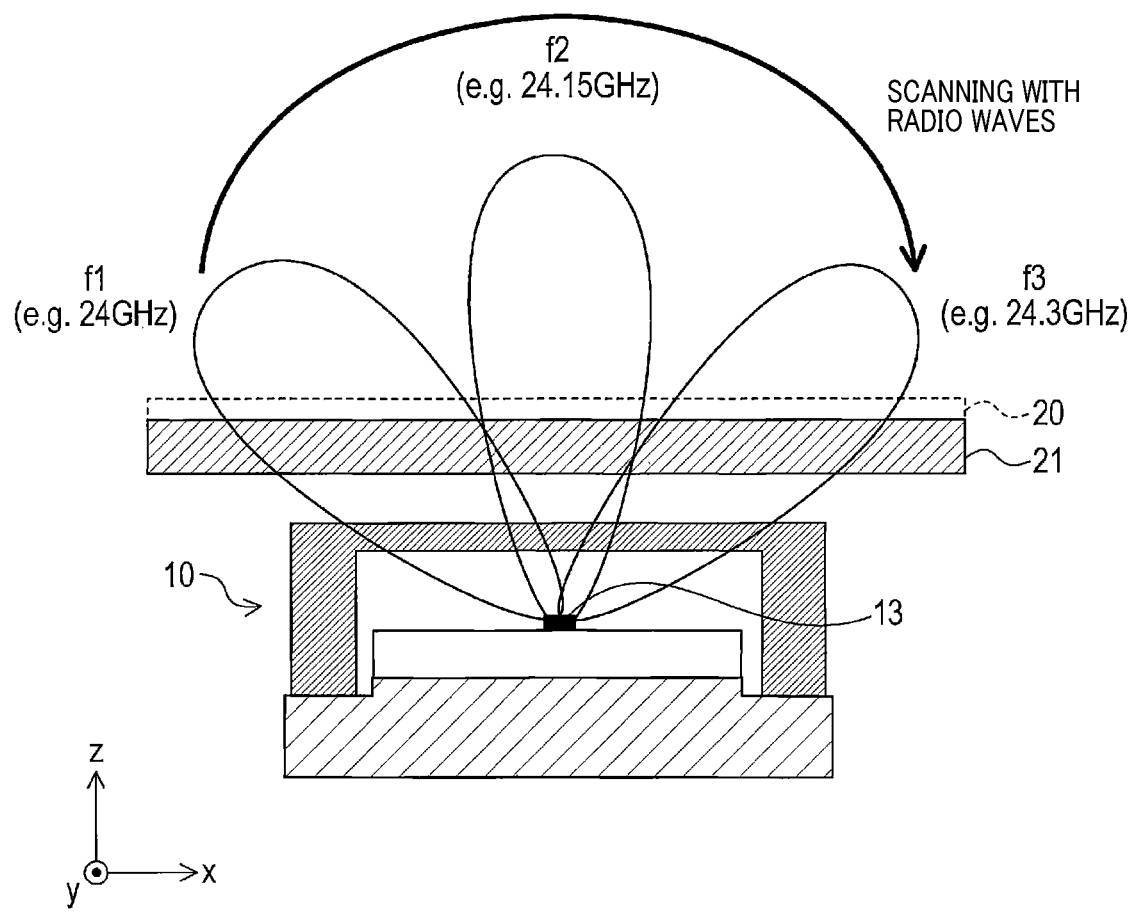
FIG. 7 is an explanatory drawing illustrating a state where scanning with radio waves radiated from the radar apparatus according to the first embodiment is performed depending on frequencies.

Hence, by sequentially changing the frequency of the radio waves sent from the transmitting antenna 13 to a frequency within the first set radiation band, a frequency within the second set radiation band, and a frequency within the third set radiation band in this order, as shown in FIG. 7, scanning is performed in the scanning direction with radio waves radiated forward from the radar apparatus 1. The feeding section 13a repeats the change among the above three types of frequencies to achieve the scanning in the scanning direction with the sent radio waves.

When scanning is performed with the sent radio waves as described above, the transmitting and receiving processing section 16 determines an arrival angle of reflected waves based on the frequency of the radio waves received by the receiving antenna 14 to determine the direction in which a target is present.

The way of changing the frequency of the radio waves sent from the transmitting antenna 13 is not limited. For example, the frequency of the sent radio waves may be changed in stages in order of the first set frequency Fs1, the second set frequency Fs2, and the third set frequency Fs3. Alternatively, for example, the frequency of the sent radio waves may be continuously changed within a certain frequency range including the first set frequency Fs1, the second set frequency Fs2, and the third set frequency Fs3, and the continuous change may be repeated.

(1-4) Effects of First Embodiment

The first embodiment described above provides the following effects (1a) to (1c).

(1a) In the radar apparatus 1 of the present embodiment, the filter portion 20 is disposed in front of the radar body 10. The radio waves radiated from the antenna section 11 are appropriately transmitted through one of the plurality of band transmission portions 30, 40, and 50, whose transmission frequency band includes the frequency of the radio waves radiated from the antenna section 11, of the filter portion 20. However, the radio waves radiated from the antenna section 11 are suppressed or inhibited from being transmitted by the band transmission portions, whose transmission frequency band does not include the frequency of the radio waves radiated from the antenna section 11, of the filter portion 20.

Hence, by sequentially changing the frequency of the radio waves radiated from the antenna section 11 to frequencies within the respective set radiation bands, the band transmission portion through which the radio waves are appropriately transmitted is changed in the filter portion 20. Thereby, scanning is performed with the radio waves, which are externally radiated through the filter portion 20, in the scanning direction.

Thus, according to the radar apparatus 1 of the first embodiment, the frequency of the sent radio waves is changed while the number of antennas to be used is reduced, whereby scanning with the sent radio waves can be performed.

(1b) Each of the band transmission portions 30, 40, and 50 of the filter portion 20 includes a plurality of ring-shaped conductor patterns 32 regularly arranged in the perpendicular direction. Although the filter portion 20 has such a simple configuration, the filter portion 20 can appropriately transmit only radio waves within a specific frequency band and suppress other radio waves from being transmitted.

(1c) The transmission frequency bands of the band transmission portions 30, 40, and 50 of the filter portion 20 are set so as to be different from each other by adjusting arrangement intervals of the conductor patterns 32 in the perpendicular direction. Hence, the respective transmission frequency bands of the band transmission portions 30, 40, and 50 can be easily set to desired bands.

2. Second Embodiment

Figure 8:
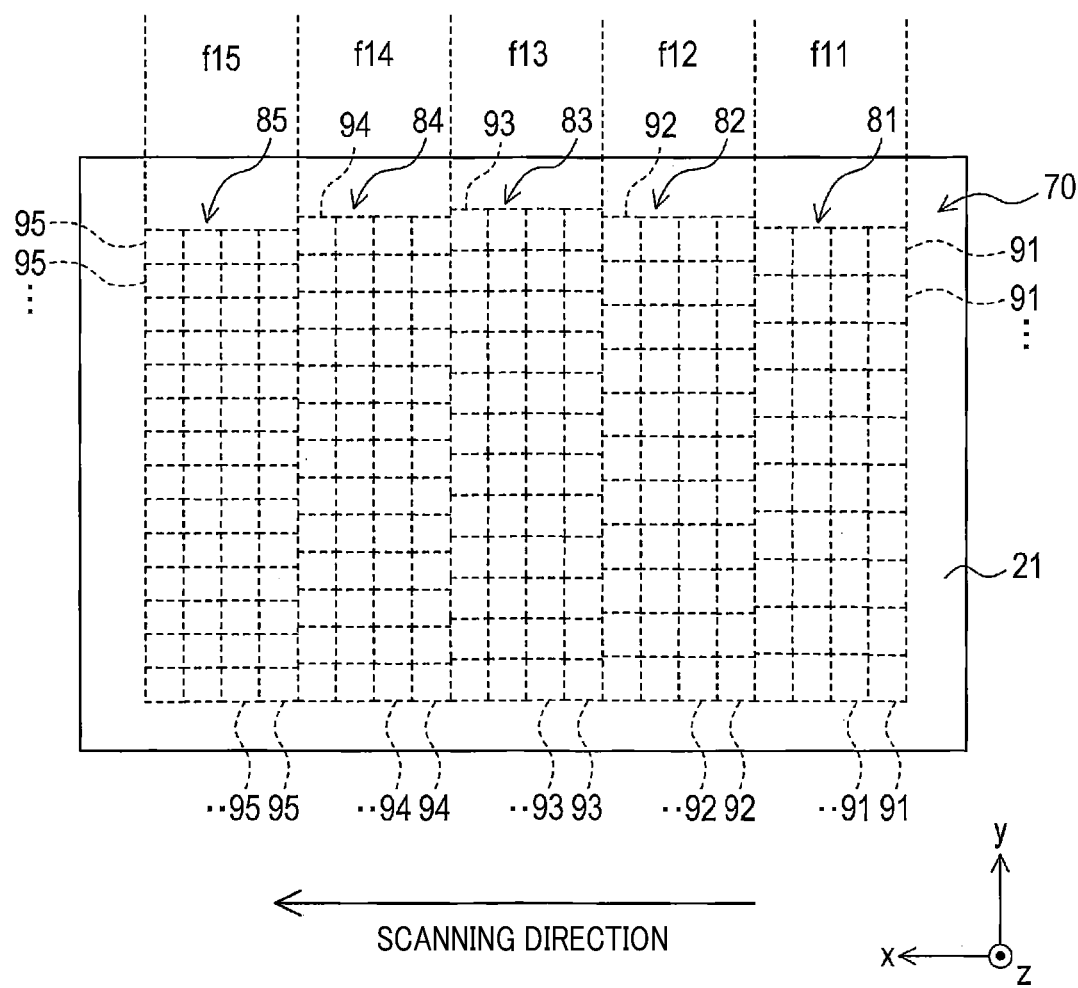
FIG. 8 is an explanatory drawing illustrating the configuration of a filter portion according to a second embodiment.

In the second embodiment, another example of the filter portion will be described. The configuration of the filter portion is not limited, and may be that shown in FIG. 8. A filter portion 70 of the second embodiment shown in FIG. 8 differs from the filter portion 20 of the first embodiment in the number of band transmission portions arranged in the scanning direction.

Specifically, the filter portion 70 of the second embodiment includes five band transmission portions 81, 82, 83, 84, and 85 whose transmission frequency bands are different from each other and which are adjacently arranged in this order along the scanning direction.

The first band transmission portion 81 includes a plurality of filter cells 91 regularly arranged in the perpendicular direction and the scanning direction, and includes a first transmission frequency band centering on a first transmission center frequency f11. The second band transmission portion 82 includes a plurality of filter cells 92 regularly arranged in the perpendicular direction and the scanning direction, and includes a second transmission frequency band centering on a second transmission center frequency f12. The third band transmission portion 83 includes a plurality of filter cells 92 regularly arranged in the perpendicular direction and the scanning direction, and includes a third transmission frequency band centering on a third transmission center frequency f13. The fourth band transmission portion 84 includes a plurality of filter cells 94 regularly arranged in the perpendicular direction and the scanning direction, and includes a fourth transmission frequency band centering on a fourth transmission center frequency f14. The fifth band transmission portion 85 includes a plurality of filter cells 95 regularly arranged in the perpendicular direction and the scanning direction, and includes a fifth transmission frequency band centering on a fifth transmission center frequency f15. The transmission center frequencies f11 to f15 have a magnitude relation of f11<f12<f13<f14<f15.

Each of the filter cells 91 to 95 of the band transmission portions 81 to 85 includes the conductor pattern 32 shown in FIG. 4 as in the filter cells 31 to 33 of the first embodiment. As in the first embodiment, arrangement intervals of the filter cells 91 to 95 in the perpendicular direction differ among the band transmission portions 81 to 85. That is, the arrangement interval of the filter cells 91 of the first band transmission portion 81 in the perpendicular direction is the longest. The arrangement interval in the perpendicular direction becomes shorter in stages in order of the filter cells 92 of the second band transmission portion 82, the filter cells 93 of the third band transmission portion 83, and the filter cells 94 of the fourth band transmission portion 85. The arrangement interval of the filter cells 95 of the fifth band transmission portion 85 in the perpendicular direction is the shortest.

For the filter portion 70 configured as described above, the transmission frequency from the transmitting antenna 13 is sequentially changed to frequencies in the respective transmission frequency bands, as in the first embodiment, so that scanning in the scanning direction can be performed. For example, the transmission frequency may be sequentially changed in the order of f11→f12→f13→f14→f15→f11→f12→.

According to the above second embodiment described in detail, effects similar to those of the first embodiment are provided, and in addition, scanning resolution in the scanning direction can be further increased.

3. Third Embodiment

Figure 9:
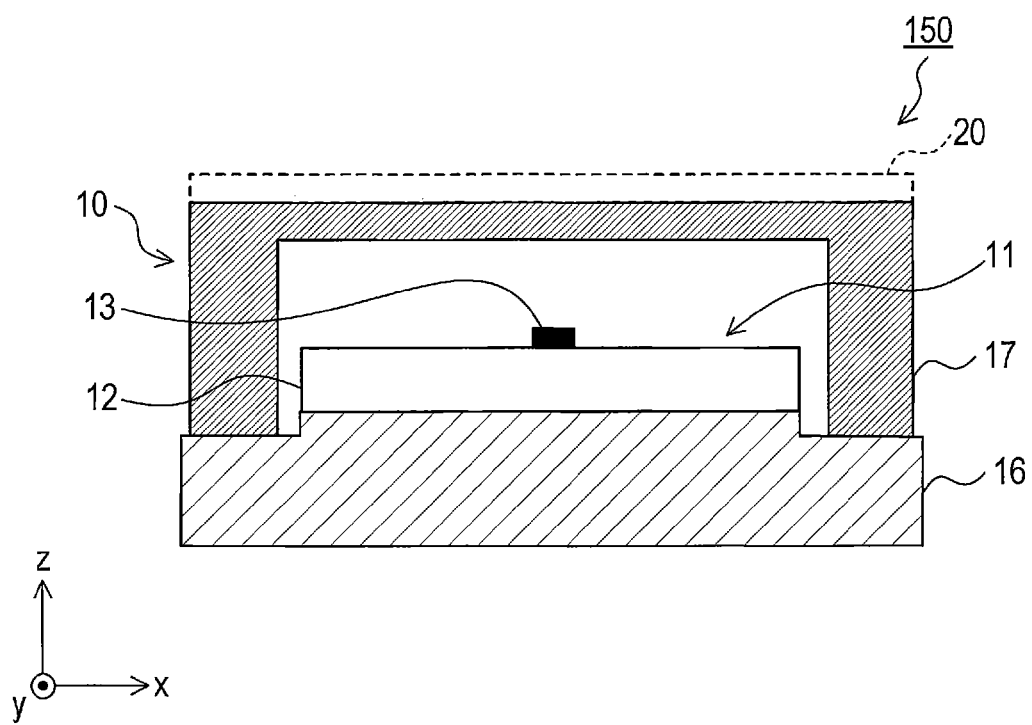
FIG. 9 is a cross-sectional view of a radar apparatus according to a third embodiment.

A radar apparatus 150 of the third embodiment shown in FIG. 9 mainly differs from the radar apparatus 1 of the first embodiment in the part to which the filter portion 20 is provided. In the first embodiment, the dielectric plate 21 is provided separately from the radar body 10 and is provided with the filter portion 20. In contrast, the radar apparatus 150 of the third embodiment does not includes the dielectric plate 21, and the filter portion 20 is provided to the cover member 17 of the radar body 10.

Specifically, the surface of the cover member 17 facing to the front of the vehicle, that is, the surface seen when the radar body 10 is viewed from the front of the vehicle, has a planar shape. The filter portion 20 is provided to the planar area.

Hence, the radar apparatus 150 configured as described above can also provide effects similar to those of the first embodiment.

4. Fourth Embodiment

Figure 10:
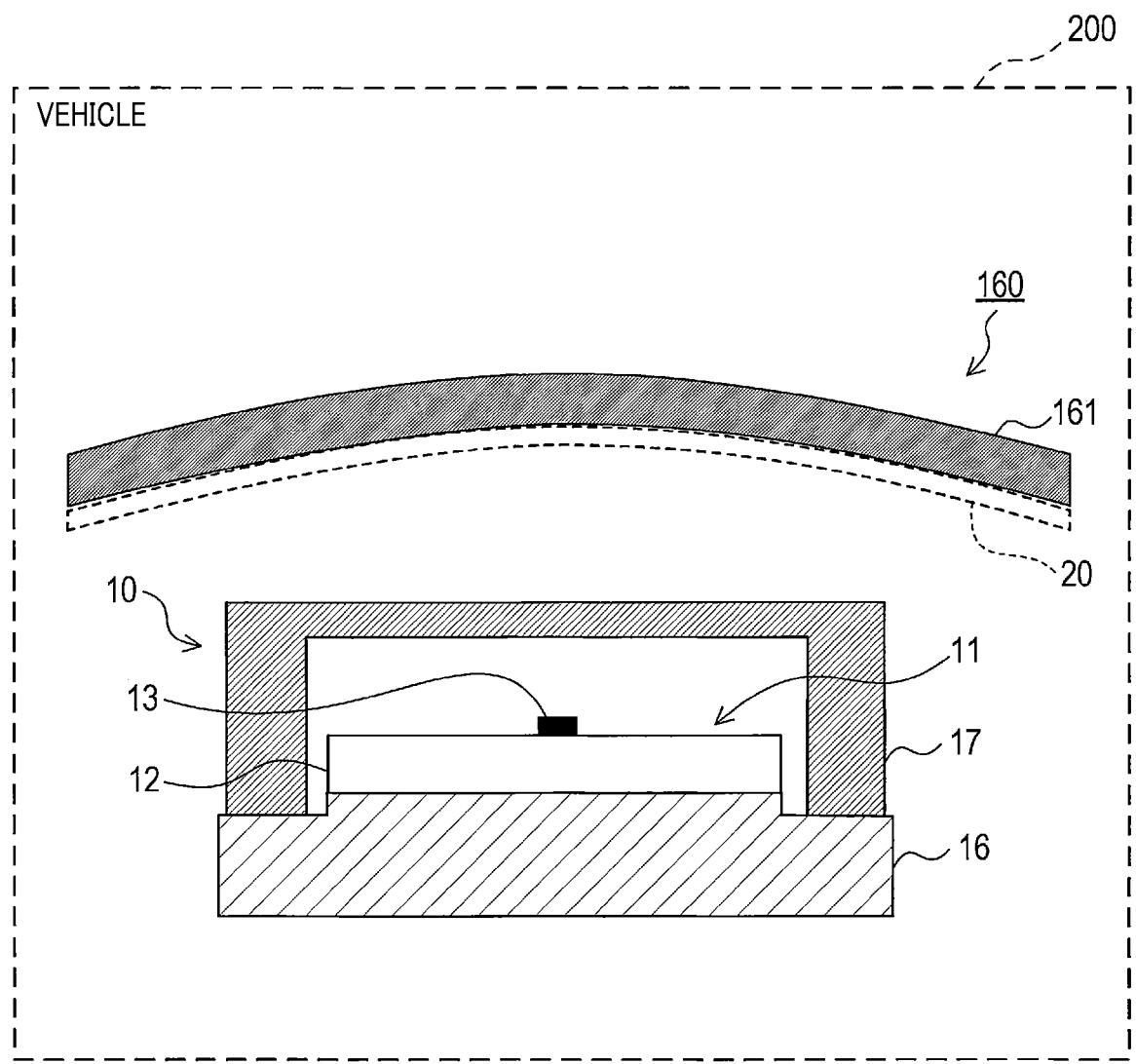
FIG. 10 is a cross-sectional view of a radar apparatus according to a fourth embodiment.

A radar apparatus 160 of the fourth embodiment shown in FIG. 10 mainly differs from the radar apparatus 1 of the first embodiment in the part to which the filter portion 20 is provided.

The radar apparatus 160 of the fourth embodiment is installed in a vehicle 200. It is noted that a radar apparatus is installed in the vehicle also in the first to third embodiments. The front end of the vehicle 200 is provided with a bumper 161. In the radar apparatus 160 of the fourth embodiment, the filter portion 20 is provided to the bumper 161.

Specifically, the bumper 161 has an exterior surface facing to the outside of the vehicle and an interior surface facing to the inside of the vehicle, and the filter portion 20 is provided to the interior surface.

The radar body 10 is provided at a position where radio waves radiated from the antenna section 11 pass through the filter portion 20 and are radiated forward from the vehicle. That is, although the part where the filter portion 20 is provided is different from that of the first embodiment, a relative positional relationship between the filter portion 20 and the radar body 10 is substantially the same as the radar apparatus 1 of the first embodiment.

Hence, the radar apparatus 150 configured as described above can also provide effects similar to those of the first embodiment.

5. Other Embodiments

Hereinbefore, embodiments of the present disclosure are described. However, the present disclosure is not limited to the above embodiments and can be implemented with various modification.

(5-1) In the first embodiment, a filter cell including a ring-shaped conductor pattern 32 is illustrated. However, the shape of the conductor pattern 32 of the filter cell is not limited to this.

Figure 11:
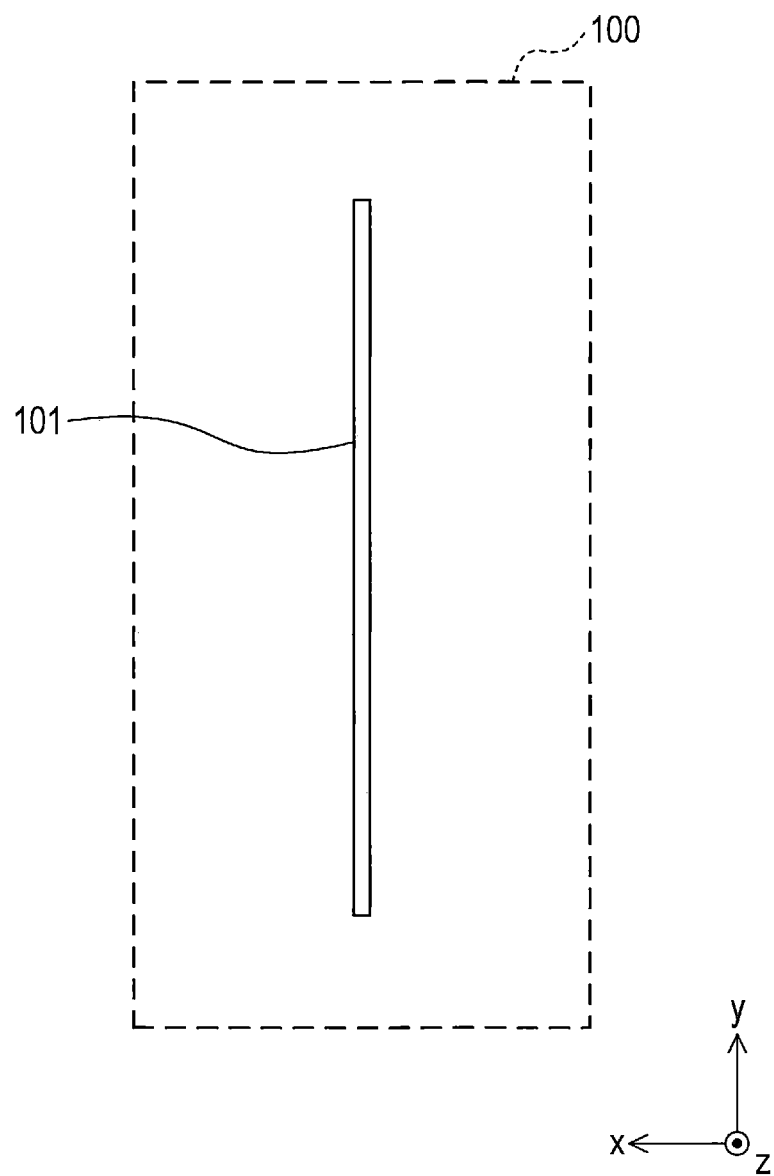
FIG. 11 is an explanatory drawing illustrating another example of a conductor pattern.

For example, a filter cell 100 shown in FIG. 11 may be used. The filter cell 100 includes a linear conductor 101 formed so as to extend in the perpendicular direction.

Figure 12:
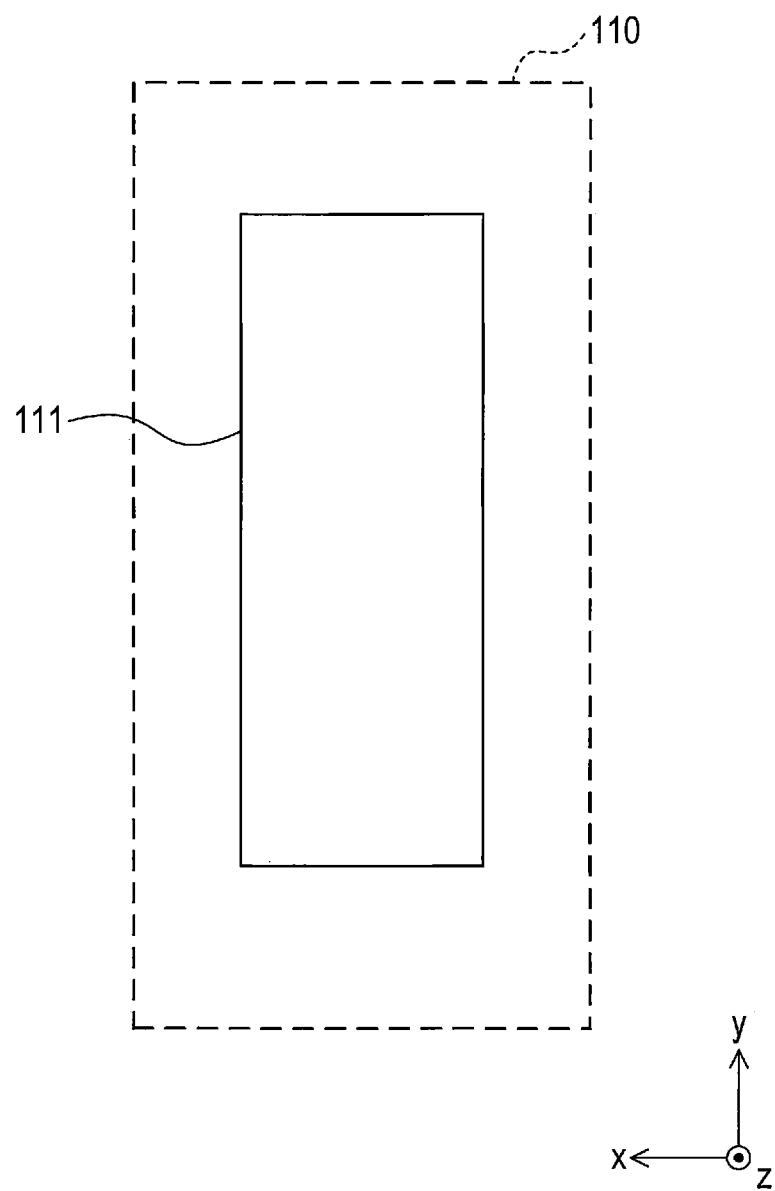
FIG. 12 is an explanatory drawing illustrating another example of a conductor pattern.

For example, a filter cell 110 shown in FIG. 12 may be used. The filter cell 110 includes a rectangular patch conductor pattern 111.

Figure 13:
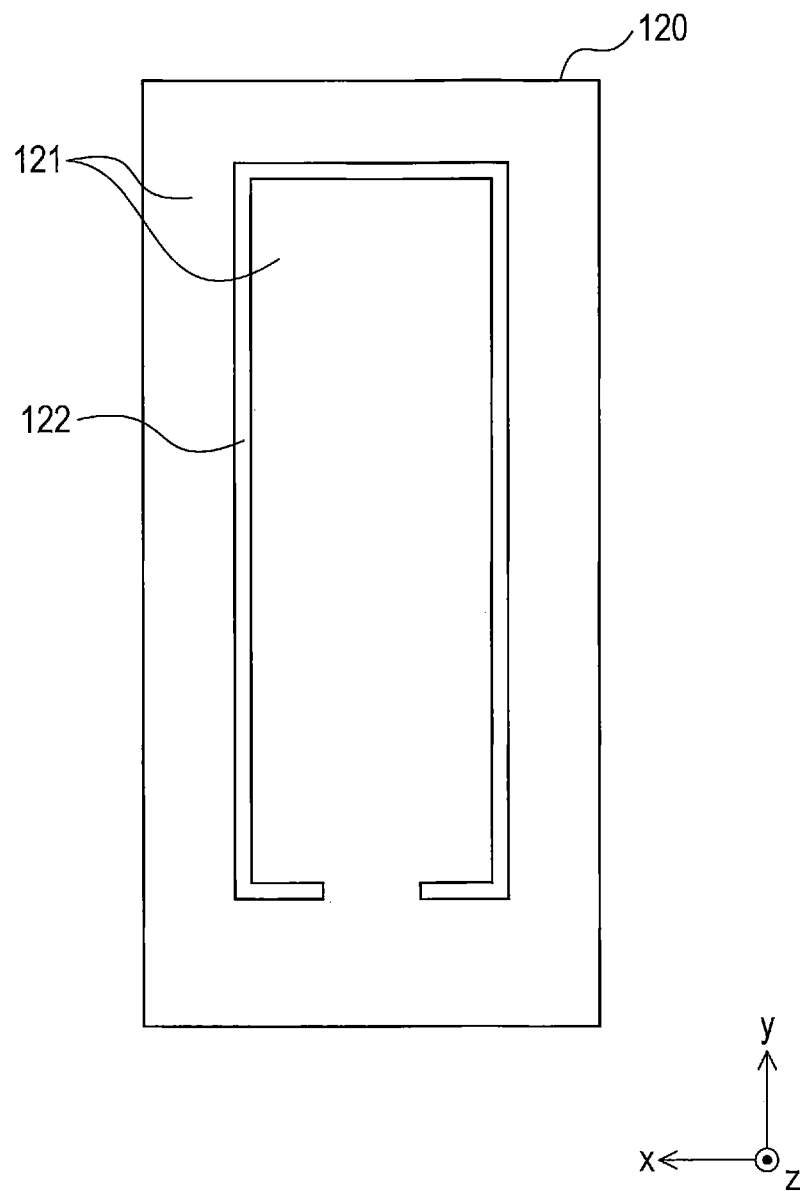
FIG. 13 is an explanatory drawing illustrating another example of a conductor pattern.

For example, a filter cell 120 shown in FIG. 13 may be used. The filter cell 120 includes a substantially rectangular conductor pattern 121. A ring-shaped slit 122 is formed inside the conductor pattern 121. That is, the filter cell 120 shown in FIG. 13 is configured by removing the conductor pattern 32 from the filter cell 31 of the first embodiment and disposing a conductor in the whole area where the conductor pattern 32 has not existed.

Figure 14:
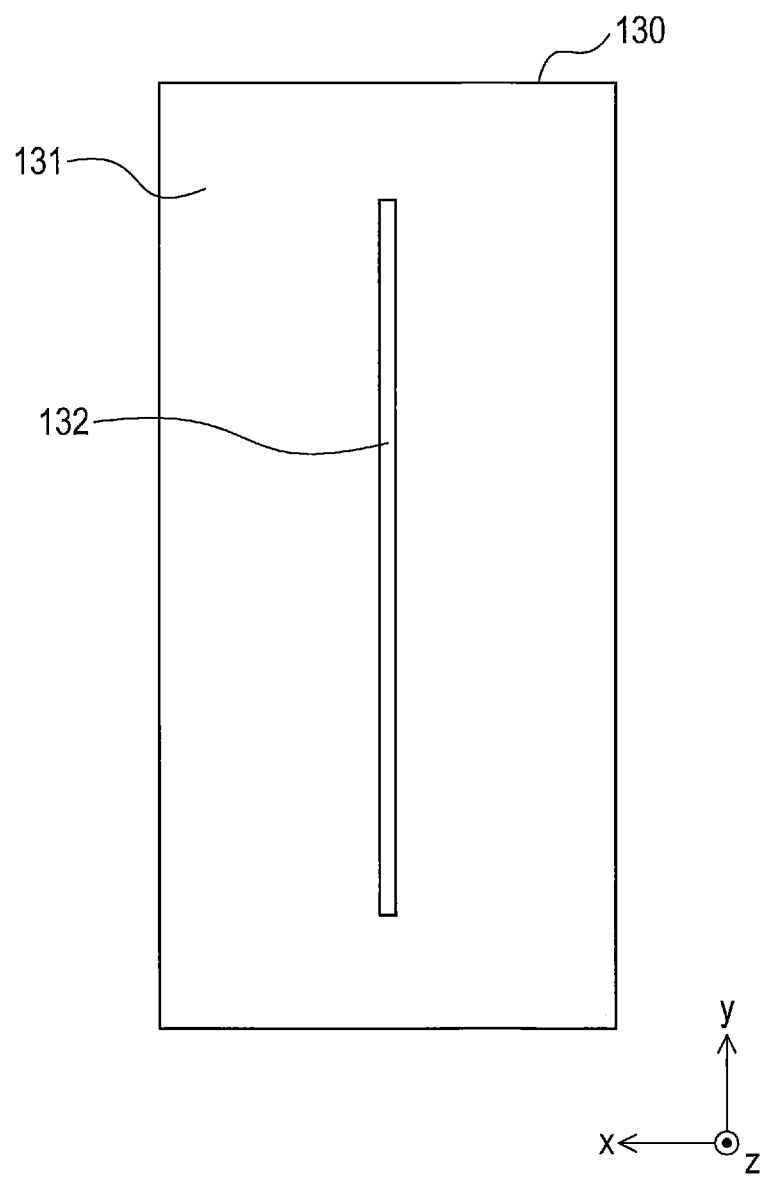
FIG. 14 is an explanatory drawing illustrating another example of a conductor pattern.

For example, a filter cell 130 shown in FIG. 14 may be used. The filter cell 130 includes a substantially rectangular conductor pattern 131. A linear slit 132 is formed inside the conductor pattern 131. That is, the filter cell 130 shown in FIG. 14 is configured by removing the conductor pattern 101 from the filter cell 100 in FIG. 11 and disposing a conductor in the whole area where the conductor pattern 101 has not existed.

(5-2) In the first embodiment, transmission center frequencies f1, f2, and f3 are respectively 24 GHz, 24.15 GHz, and 24.3 GHz, and respective transmission frequency bands are corresponding transmission center frequencies ±0.05 GHz. However, this is one example. The transmission center frequencies of the respective band transmission portions are not limited, and bandwidths of the transmission frequency bands of the band transmission portions are not limited. The transmission center frequency is not necessarily the center of the transmission frequency band.

The frequency characteristics of the band transmission portion have a tendency shown in FIG. 5, that is, one center frequency where transmission electrical power is maximum is present, and the transmission electrical power lowers away from the center frequency. This is one example. The band transmission portion may have transmission electrical power characteristics different from those in FIG. 5. That is, the band transmission portion may be configured to be able to appropriately transmit radio waves within a desired transmission frequency band to be transmitted and suppress or inhibit radio waves having a frequency outside the transmission frequency band from being transmitted.

The adjacent two transmission frequency bands may be separated from each other, be successive, or overlap with each other.

(5-3) The two band transmission portions adjacent in the scanning direction may not be completely adjacent to each other, or may be separated from each other.

For example, an auxiliary band transmission portion may be provided between the first band transmission portion 30 and the second band transmission portion 40, the auxiliary band transmission portion having transmission frequency band slightly lower than that of the first band transmission portion 30. This aims to further clarify an electrical boundary between the first band transmission portion 30 and the second band transmission portion 40. Similarly, an auxiliary band transmission portion may be provided between the second band transmission portion 40 and the third band transmission portion 50, the auxiliary band transmission portion having transmission frequency band slightly higher than that of the third band transmission portion 50. This aims to further clarify an electrical boundary between the second band transmission portion 40 and the third band transmission portion 50.

(5-4) The number of band transmission portions of the filter portion is three in the first embodiment, and five in the second embodiment. However, this is one example. The number of band transmission portions may be other than three and five. The arrangement of the plurality of band transmission portions is not limited. That is, the relative positional relationship between the plurality of band transmission portions is not limited.

(5-5) The scanning direction is not limited. The scanning direction may be limited depending on at least one of the transmission frequency band of the plurality of band transmission portions of the filter portion and the positions at which the plurality of band transmission portions are arranged. For example, in the radar apparatus 1 of the first embodiment, the positions of the first band transmission portion 30 and the third band transmission portion 50 may be interchanged. In this case, the scanning direction is opposite to that of the first embodiment.

For example, at least one of various scanning directions and various scanning orders may be achieved by changing the order of frequencies of radio waves radiated from the transmitting antenna. For example, in the radar apparatus 1 of the first embodiment, the frequency of radio waves may be changed in order of f3→f2→f1. In this case, the scanning direction is opposite to that of the first embodiment. For example, the frequency of radio waves may be changed in order of f1→f3→f2. In this case, the scanning direction changes every single scan.

(5-6) The position where the filter portion is provided is not limited. For example, the filter portion may be provided at a position where radio waves radiated from the antenna section to a detection range enter. In the above embodiments, the filter portion is provided to the dielectric plate 21, the cover member 17 of the radar body 10, or the bumper 161 of the vehicle 200. However, the filter portion may be provided to another part.

(5-7) In the vehicle, the position where the radar apparatus is mounted and the number of the radar apparatus are not limited. For example, the radar apparatus may be configured to be mounted to a side surface of the vehicle so as to detect targets present lateral to the vehicle, or may be configured to be mounted to the rear end of the vehicle so as to detect targets present behind the vehicle (e.g. a following vehicle).

(5-8) In the above embodiments, a plurality of functions of a single component may be achieved by a plurality of components, or a single function achieved by a single component may be achieved by a plurality of components. Furthermore, a plurality of functions achieved by a plurality of components may be achieved by a single component, or a single function achieved by a plurality of components may be achieved by a single component. Furthermore, a part of the configuration of the embodiments may be omitted. Furthermore, at least one of the components of one of the embodiments may be added to another of the embodiments or substituted by another component of the other embodiments.

As an aspect of the present disclosure, a radar apparatus (1, 150, 160) is provided which includes an antenna section (13), a dielectric member (21, 17, 161), a filter portion (20, 70) and a power feeding section (16a).

The antenna section is configured to radiate radio waves based on fed electrical power. The dielectric member is a plate member provided so as to transmit the radio waves radiated from the antenna section (herein after, referred to as radiated radio waves). The filter portion includes a plurality of band transmission portions (30, 40, 50, 81 to 85) provided to the dielectric member. The plurality of band transmission portions are arranged along a scanning direction. The plurality of band transmission portions are configured to respectively transmit radio waves within different specific transmission frequency bands. The power feeding section is configured to feed the electrical power to the antenna section. The power feeding section is configured to set specific frequency bands included in the respective specific transmission frequency bands to set radiation bands and sequentially change a frequency of the radio waves radiated from the antenna section to frequencies within the respective set radiation bands.

According to the radar apparatus having the configuration described above, in the filter portion, the radiated radio waves are appropriately transmitted through one of the band transmission portions whose corresponding transmission frequency band includes a frequency of the radiated radio waves. The band transmission portion whose corresponding transmission frequency band does not include a frequency of the radiated radio waves suppresses or inhibits the radiated radio waves from being transmitted.

Hence, by changing the frequency of the radio waves radiated from the antenna section is sequentially changed to frequencies within the respective set radiation bands, the band transmission portion through which the radio waves are appropriately transmitted is changed in the filter portion. Thereby, scanning is performed with the radio waves, which are externally radiated through the filter portion.

Thus, the radar apparatus having the configuration described above can perform scanning with sent radio waves while reducing the number of antennas to be used.

What is claimed is:

1. A radar apparatus comprising:
   an antenna section that is configured to radiate radio waves based on fed electrical power;
   a plate dielectric member that is provided so that the radio waves radiated from the antenna section passes through the plate dielectric member;
   a filter portion that is provided to the dielectric member and includes a plurality of band transmission portions arranged along a scanning direction, the plurality of band transmission portions being configured to respectively transmit radio waves within different specific transmission frequency bands; and
   a power feeding section that is configured to feed the electrical power to the antenna section and is configured to set specific frequency bands included in the respective specific transmission frequency bands to set radiation bands and sequentially change a frequency of the radio waves radiated from the antenna section to frequencies within the respective set radiation bands, wherein
   the plurality of band transmission portions respectively include a plurality of conductor patterns regularly arranged along a perpendicular direction orthogonal to the scanning direction.

2. The radar apparatus according to claim 1, wherein arrangement intervals of the plurality of conductor patterns in the perpendicular direction in the respective plurality of band transmission portions correspond to the transmission frequency bands of the band transmission portions.

3. The radar apparatus according to claim 2, wherein the band transmission portions are configured so that the arrangement interval is shorter as the corresponding transmission frequency band is higher.

4. The radar apparatus according to claim 1, wherein the plurality of conductor patterns include a ring-shaped conductor pattern.

5. The radar apparatus according to claim 1, further comprising a cover member configured so as to cover the antenna section, wherein
   the dielectric member is the cover member.

6. The radar apparatus according to claim 1, wherein
   the radar apparatus is installed in a vehicle,
   the vehicle includes a bumper, and
   the dielectric member is the bumper.

* * * * *